(12) United States Patent
Nguyen

(10) Patent No.: US 11,776,383 B1
(45) Date of Patent: *Oct. 3, 2023

(54) SYSTEM AND METHOD FOR ONCOMING VEHICLE DETECTION AND ALERTS FOR A WASTE COLLECTION VEHICLE

(71) Applicant: WM INTELLECTUAL PROPERTY HOLDINGS L.L.C., Houston, TX (US)

(72) Inventor: Vu Nguyen, Houston, TX (US)

(73) Assignee: WM Intellectual Property Holdings, L.L.C., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,905

(22) Filed: Oct. 28, 2022

Related U.S. Application Data

(63) Continuation of application No. 17/464,388, filed on Sep. 1, 2021, now Pat. No. 11,488,467.

(60) Provisional application No. 63/073,708, filed on Sep. 2, 2020.

(51) Int. Cl.
*G08B 25/01* (2006.01)
*G08B 7/06* (2006.01)
*G06N 20/00* (2019.01)
*G08B 21/18* (2006.01)
*G06V 20/58* (2022.01)

(52) U.S. Cl.
CPC ............ *G08B 25/016* (2013.01); *G06N 20/00* (2019.01); *G06V 20/584* (2022.01); *G08B 7/06* (2013.01); *G08B 21/182* (2013.01); *G06V 2201/08* (2022.01)

(58) Field of Classification Search
CPC ...... G08B 25/016; G08B 7/06; G08B 21/182; G06N 20/00; G06K 9/00825; G06K 2209/23

See application file for complete search history.

(56) References Cited

U.S. PATENT DOCUMENTS 5,586,031 A * 12/1996 Fussl ...................... B62D 7/142
                                                    180/197
8,630,773 B2   1/2014 Lee et al.
9,718,405 B1   8/2017 Englander et al.
(Continued)

FOREIGN PATENT DOCUMENTS

DE   102012006536   10/2013
EP        774425     5/1997
(Continued)

OTHER PUBLICATIONS

Brzozowski, Carol; Systems to Prevent Backing Accidents; Jul. 27, 2017; 14 pages; MSW Management.
(Continued)

*Primary Examiner* — Santiago Garcia
(74) *Attorney, Agent, or Firm* — Greenberg Traurig LLP

(57) ABSTRACT

An object detection, tracking and alert system for use in connection with a waste collection vehicle is provided. The system can determine if an external moving object in the surrounding environment of the waste collection vehicle, such as another vehicle or a bicycle, is moving directly towards the waste collection vehicle, and then send one or more alerts to the driver and/or riders on the waste collection vehicle as well as any other waste collection vehicles in the surrounding area.

6 Claims, 3 Drawing Sheets

(56) References Cited

U.S. PATENT DOCUMENTS

| | | |
|---|---|---|
| 10,594,991 B1 | 3/2020 | Skolnick |
| 11,488,467 B1 | 11/2022 | Nguyen |
| 2010/0119341 A1* | 5/2010 | Flood .................... B65F 1/1484 |
| | | 414/406 |
| 2011/0096166 A1 | 4/2011 | Englander et al. |
| 2017/0243363 A1* | 8/2017 | Rodoni ............. H04N 5/23293 |
| 2019/0005507 A1* | 1/2019 | Rodoni .................. G06Q 10/30 |
| 2019/0225422 A1 | 7/2019 | Wrigley et al. |
| 2019/0325220 A1* | 10/2019 | Wildgrube ............. B65F 3/048 |
| 2020/0180612 A1 | 6/2020 | Finelt et al. |
| 2020/0247609 A1* | 8/2020 | Maroney ................... B65F 3/02 |
| 2020/0284872 A1* | 9/2020 | Fix ........................ G01S 13/886 |
| 2020/0401807 A1* | 12/2020 | Wildgrube ............. B65F 3/048 |
| 2020/0407807 A1 | 12/2020 | Holzapeel et al. |
| 2021/0024068 A1* | 1/2021 | Lacaze .................. B60W 30/18 |
| 2021/0325529 A1* | 10/2021 | Koga .................... G01S 13/931 |

FOREIGN PATENT DOCUMENTS

| | | |
|---|---|---|
| EP | 909959 | 4/1999 |
| EP | 1342677 | 9/2003 |
| EP | 2810825 | 12/2014 |
| EP | 2910497 | 8/2015 |
| JP | 2018-193206 | 12/2018 |
| KR | 10-2036004 | 10/2019 |
| WO | 2019/028528 | 2/2019 |

OTHER PUBLICATIONS

Conroy, Harriette; Brigade Electronics Explains How Garbage Truck Technology is Helping to Protect Vulnerable Road Users; May 13, 2019; 2 pages; PR Newswire Association LLC.

Rosco Collision Avoidance; Mobileye Shield+ Collision Avoidance System; 5 pages; Jan. 1, 2019; U.S.

* cited by examiner

SYSTEM AND METHOD FOR ONCOMING VEHICLE DETECTION AND ALERTS FOR A WASTE COLLECTION VEHICLE

RELATED APPLICATIONS

This application is a continuation application and claims the benefit, and priority benefit, of U.S. patent application Ser. No. 17/464,388, filed Sep. 1, 2021, which claims the benefit, and priority benefit, of U.S. Provisional Patent Application Ser. No. 63/073,708, filed Sep. 2, 2020, the disclosure and contents of which are incorporated by reference herein in their entirety.

BACKGROUND

Field of Invention

Waste collection vehicles often have one or more workers riding on the back of the vehicle as the vehicle travels through a designated route and customer waste is collected.

For example, workers can stand on a step at the rear end of the waste collection vehicle. The workers can ride as the vehicle moves to various pick-up locations, and then step off to load or collect waste as needed.

These workers often risk injury from the occasional rear-end or side collisions that can occur between the waste collection vehicle and passenger cars or other approaching vehicles.

Improvements in this field of technology are therefore desired.

SUMMARY

The following presents a simplified summary of the disclosed subject matter in order to provide a basic understanding of some aspects thereof. This summary is not an exhaustive overview of the technology disclosed herein.

In certain illustrative embodiments, a system for performing oncoming vehicle detection by a waste collection vehicle is provided. The system can include an optical sensor disposed on the waste collection vehicle and configured to capture data relating to another vehicle that is approaching the waste collection vehicle; a memory storage area, and a processor in communication with the memory storage area and configured to, in real time during performance of a waste service activity by the waste collection vehicle: receive the data from the optical sensor; compare the data to a predetermined threshold condition for generating an alarm command based on data stored in the memory storage area; determine, based on the comparison, whether the status has met or exceeded the predetermined threshold condition; if the status has met or surpassed the predetermined threshold condition, generate an alarm command; and execute the alarm command, wherein the alarm command comprises one or more of: (i) a lighting alarm, (ii) a sound alarm, and (iii) an alarm generated from a wearable device for a worker on the waste collection vehicle. The comparing and determining can be performed using machine learning based on a set of programmed data associated with the predetermined threshold condition. The set of programmed data comprises information relating to a characteristic of an approaching vehicle, and wherein the information includes different exemplary status conditions, and wherein a first subsection of the information is pre-identified, based on the exemplary status condition, as meeting or exceeding the predetermined threshold condition, and wherein a second subsection of the information is pre-identified, based on the exemplary status condition, as not meeting or exceeding the predetermined threshold condition. The processor is trained, using machine learning, to recognize and identify the status of the approaching vehicle based on the data received from the optical sensor. The processor is trained, using machine learning, to match the recognized status of the approaching vehicle with the information regarding the exemplary status condition in the set of programmed data that has a corresponding status, and then categorize the status of the approaching vehicle as either (i) meeting or exceeding, or (ii) not meeting or exceeding, the predetermined threshold condition. The data comprises one or more of the identity, proximity, velocity, direction of travel, size and shape of the vehicle that is approaching the waste collection vehicle. The optical sensor comprises one or more of a still camera, a video camera, a SONAR detection device, a LIDAR detection device and a RADAR detection device.

In certain illustrative embodiments, a method for performing oncoming vehicle detection by a waste collection vehicle is provided. Data can be captured relating to an approaching vehicle that is indicative of the status of the approaching vehicle, wherein the data is captured using an optical sensor located on the waste collection vehicle. The status from the data can be compared to a predetermined threshold condition stored in a memory database. Based on the comparison, a determination can be made whether the status has met or exceeded the predetermined threshold condition. If the status has met or surpassed the predetermined threshold condition, an alarm command can be generated. The alarm command can be executed, wherein the alarm command comprises one or more of: (i) a lighting alarm, (ii) a sound alarm, and (iii) an alarm generated from a wearable device for a worker on the waste collection vehicle.

BRIEF DESCRIPTION OF THE DRAWINGS

A better understanding of the presently disclosed subject matter can be obtained when the following detailed description is considered in conjunction with the following drawings, wherein.

While certain preferred illustrative embodiments will be described herein, it will be understood that this description is not intended to limit the subject matter to those embodiments. On the contrary, it is intended to cover all alternatives, modifications, and equivalents, as may be included within the spirit and scope of the subject matter as defined by the appended claims.

DETAILED DESCRIPTION

The presently disclosed subject matter relates generally to systems and methods for oncoming vehicle detection and alerts for use in connection with waste collection vehicles.

In certain illustrative embodiments, an object detection, tracking and alert system 5 for use in connection with a waste collection vehicle 10 is provided. Waste collection vehicle 10 can have a front end 10a and a rear end 10b. The system 5 can determine if an external moving object in the surrounding environment of the waste collection vehicle 10, such as another vehicle or a bicycle, is moving directly towards the waste collection vehicle 10, and then send one or more alerts to the driver and/or riders on the waste collection vehicle 10 as well as any other waste collection vehicles in the surrounding area.

For example, if a driver of a car is distracted and the car approaches the rear end 10b of a waste collection vehicle 10 at a fast rate of speed, the presently disclosed system 5 is capable of signaling and alerting the riders working on the collection vehicle 10, as well as the driver, of the potential for a collision to occur, thus giving the riders and driver an opportunity to avoid possible injury especially if they are potentially distracted from their surroundings while performing their own daily routines and work processes.

In certain illustrative embodiments, the presently disclosed system 5 is a reverse detection system, whereby sensing occurs and alerts would be triggered when some moving object is approaching and/or about to hit the waste collection vehicle 10, as opposed to the more typical application where sensing occurs and an alert is triggered when the waste collection vehicle 10 is approaching and/or about to hit another object.

Figure 1:
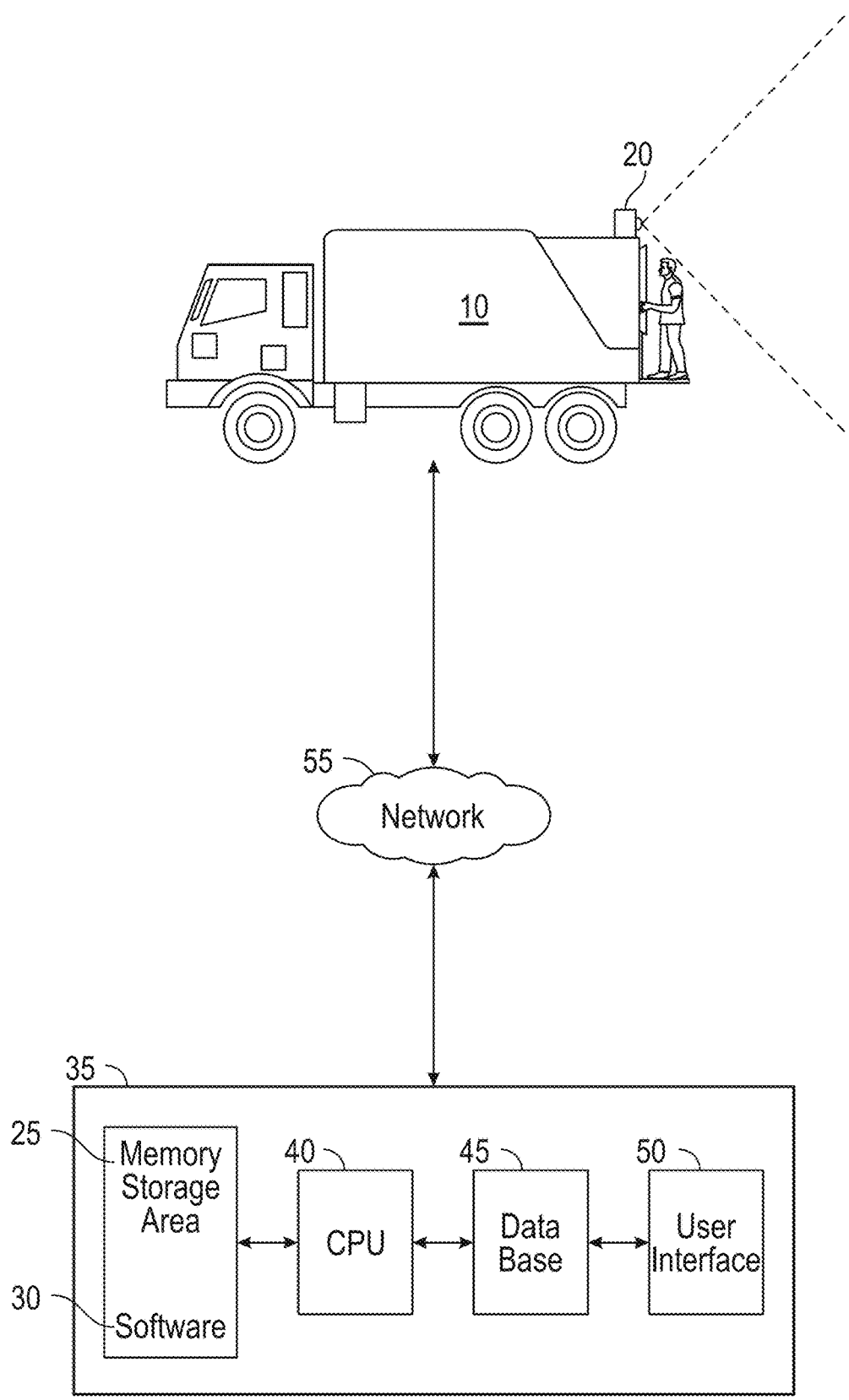
FIG. 1 is an environment for a computing network for a waste services vehicle in accordance with an illustrative embodiment of the presently disclosed subject matter.

FIG. 1 herein is an illustrative example of a waste collection vehicle 10 according to the embodiments described herein. The waste collection vehicle 10 (or other like phrases used herein such as waste service vehicle) is configured to provide services to customers, which can include typical lines of waste industry services such as waste collection and transport and/or recycling for commercial, residential and/or industrial. For example, the waste collection vehicle 10 can collect waste or recyclables from a plurality of containers which will typically be assigned to, or associated with, specific customers registered to a waste collection company.

In certain illustrative embodiments, the waste collection vehicle 10 can have one or more optical sensors 20 installed at various location on the collection vehicle 10. The optical sensors 20 can detect and collect data sets that comprise data regarding externally occurring objects and activities, such as other approaching vehicles in the vicinity of the waste collection vehicle 10. The optical sensor 20 can be, for example, a outward facing camera located on the rear end 10b of the waste collection vehicle 10 that collects still and/or video images, and can also utilize other detection and collection technologies as described in more detail herein.

In certain illustrative embodiments, the collected data sets and data therein can be stored on an associated computer and processor. The associated computer and processor can include a central server 35 with software 30 that communicates with one or more memory storage areas 25. The memory storage areas 25 can be, for example, multiple data repositories which also store other pre-loaded data. A database 45 for data storage can be in the memory storage area 25 and/or in one or more supplementary external storage devices as are well known in the art.

In the illustrative embodiment of FIG. 1, a exemplary computer system and associated communication network is shown. In certain illustrative embodiments, central server 35 can be configured to receive and store operational data (e.g., data received from waste services vehicle 10) and evaluate the data to aid waste services company in improving operational efficiency. Central server 35 can include various means for performing one or more functions in accordance with embodiments of the present invention, including those more particularly shown and described herein; however, central server 35 may include alternative devices for performing one or more like functions without departing from the spirit and scope of the present invention.

In certain illustrative embodiments, central server 35 can include standard components such as processor or CPU 40 and user interface 50 for inputting and displaying data, such as a keyboard and mouse or a touch screen, associated with a standard laptop or desktop computer. Central server 35 is associated with a network 55 for wireless or other means of communication with an onboard computer on waste services vehicle 10.

Central server 35 may include software 30 that communicates with one or more memory storage areas 25. Memory storage areas 25 can be, for example, multiple data repositories which stores pre-recorded data pertaining to a plurality of waste and customer information. Database 45 for data storage can be in memory storage area 25 and/or supplementary external storage devices as are well known in the art.

While a "central server" is described herein, a person of ordinary skill in the art will recognize that embodiments of the present invention are not limited to a client-server architecture and that the server need not be centralized or limited to a single server, or similar network entity or mainframe computer system. Rather, the server and computing system described herein may refer to any combination of devices or entities adapted to perform the computing and networking functions, operations, and/or processes described herein without departing from the spirit and scope of embodiments of the present invention.

In certain illustrative embodiments, the optical sensors 20 can include one or more outward-facing cameras for capturing still or video images. The outward-facing cameras can be positioned towards the rear end 10b of the vehicle 10, but cameras could be placed on other locations around the waste collection vehicle 10 as well, such as anywhere on the front end 10a, or on the side or the top or bottom of the waste collection vehicle 10. In certain illustrative embodiments, one or more of the optical sensors 20 can be directed towards major blind spots that the driver does not have a clear view of and where workers are collecting waste at the customer site.

In certain illustrative embodiments, the system 5 can also include software 30 with associated machine learning algorithms that, when executed by the processor 40, control the operation of the system 5. The software 30 can be designed such that the optical sensors 20 can detect and recognize approaching objects such as vehicles, people, and/or bicycles. In certain illustrative embodiments, the system 5 can capture and utilize images and other data relating to the surrounding environment and the software 30 can allow the system 5 to decipher whether certain targeted objects are present. Stored data comprising still and/or video images and other data can be provided to depict or model what could be considered a moving object with high accuracy.

Figure 2:
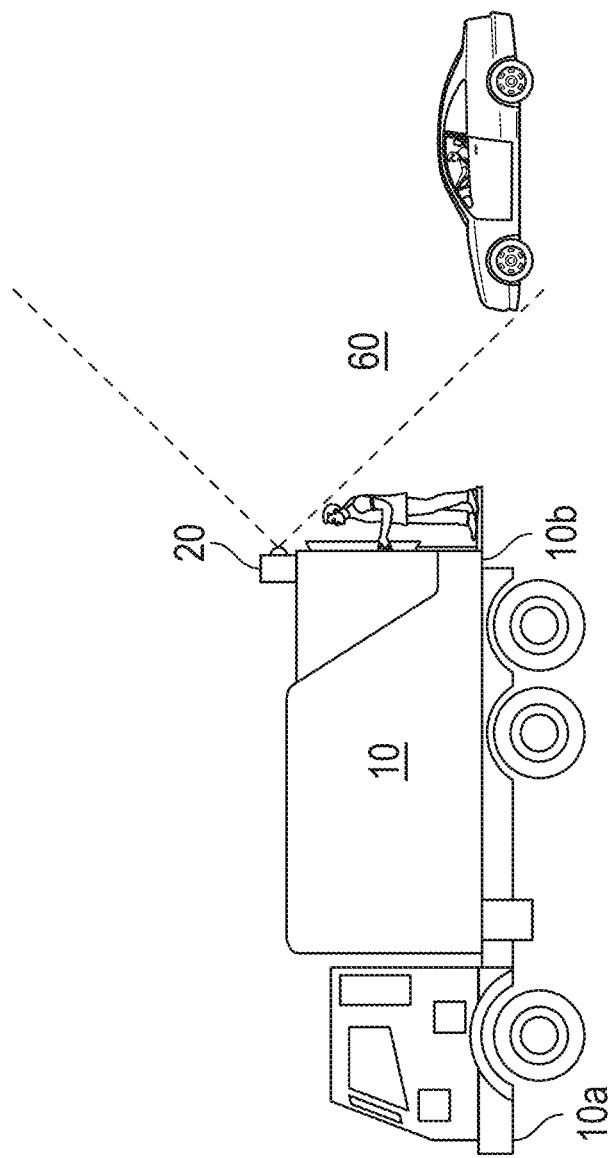
FIG. 2 is an environment for a waste services vehicle having motion detection capability in accordance with an illustrative embodiment of the presently disclosed subject matter.

In certain illustrative embodiments, such as shown in FIG. 2, the system 5 can utilize optical sensors 20 comprising one or more detection devices that can create a detection field 60 that utilizes detection means such as SONAR (sound navigation and ranging), LiDAR (light imaging detection and ranging) and/or RADAR (radio detection and ranging), either independent from, or together with, the camera functionality. For example, if there is inclement weather, a camera-based solution may have limited visibility due to raindrops on the camera lens. LIDAR solutions will emit pulse light waves into the surrounding area and then those light waves will bounce back and provide proximity readings for external objects. RADAR will emit radio signals and work to triangulate the positioning of the external objects. SONAR can act similarly for sound waves. A SONAR, LIDAR and/or RADAR based system can replace or help augment a camera-based solution by improving the depth perception algorithm that the software model uses as well as provide redundancies to increase accuracy for camera-based systems. The SONAR, LIDAR and RADAR technologies are also beneficial for reverse detection, as well as for detecting the location of the approaching vehicle and understanding where the approaching vehicle is positioned relative to the waste collection vehicle 10 at any particular moment in time.

In certain illustrative embodiments, optical sensors 20 capable of infrared detection could also be utilized. For example, if infrared light patterns are disrupted in a particular sequence, that would be an indication of whether another vehicle is approaching the waste collection vehicle 10.

In certain illustrative embodiments, trigger events can be utilized. As used herein, a "trigger event" means an event that is recognized by the detection system as meeting a predefined threshold for providing an alarm notice, such as a vehicle that is approaching the waste collection vehicle 10 at, or above, a designated speed or velocity.

In certain illustrative embodiments, a trigger event can also initiate a mechanism to collect data on the external event, such as a process to save camera images or other collected data from the optical sensors 20 into a small storage device (SSD) or other data storage means. This will provide an opportunity to examine the event and the data associated with it, such as a date and time stamp.

In certain illustrative embodiments, the system 5 can also perform a velocity analysis for the external objects approaching the waste collection vehicle 10. Utilizing the information collected from the object detection system, the software 30 can utilize algorithms to analyze the external object that is detected via a comparison of the image size as the external object approaches and the associated frames per second. As the frames per second advance and the image of the external object that is detected enlarges above a pre-set rate/threshold, a trigger event would occur.

In certain illustrative embodiments, one or more alarms can be activated when there is a trigger event. For example, the alarms can be delivered from one or more alarm devices 70 that provide an alert such as a flashing light and/or an audible noise. The alarm devices 70 can be located on the optical sensor 20, or incorporated into an all-in-one box that houses the optical sensor 20, and/or can be mounted directly onto the waste collection vehicle 10. These alarms can alert drivers and workers, as well as others in the surrounding area, of impending danger from a rapidly approaching vehicle.

In certain illustrative embodiments, a variety of secondary alert mechanisms can also be provided. For example, Bluetooth technology can be utilized to alert any persons on or near the waste collection vehicle 10 of a trigger event via their personal communications devices. Also, a specialized safety vest, or watch, or other wearable device can be provided that is operationally connected to the detection system 5 and will vibrate or provide some other means of notice to its wearer (e.g., a worker on the waste collection vehicle) when there is a trigger event. There can also be an alarm device 70 located inside the cab of the waste collections vehicle 10 that will alert the driver if there is a trigger event.

In certain illustrative embodiments, the optical sensor 20 can be hard wired to the existing voltage system on the waste collection vehicle 10 for power, or can be powered independently due to one or more solar panels and batteries in the detection device.

In certain illustrative embodiments, the system 5 can utilize edge computing. If the device is an all-in-one unit, the optical sensor 20 can gather the image or data, and a computer component inside or associated with the optical sensor 20 can decode the image or data. In other illustrative embodiments, the data can also be delivered to a second computer that is either located inside the waste collection vehicle 10 or remotely at a separate location. Thus, the first computer associated with the detection device on the waste collection vehicle 10 can do the initial processing, e.g., decoding, while the second computer 35 at a different location can do all the subsequent processing, e.g., making the determination as to whether or not the approaching object is likely to collide with the waste collection vehicle 10.

In certain illustrative embodiments, the first computer comprises one or more smaller or "satellite" computers that can be deployed on the waste collection vehicle 10, i.e., at the "edge" of the network, to upload data to the second computer 35 which functions as a central computer/processing unit 40 to compute the machine learning aspects and then redistribute back out to the satellite units. The second computer can utilize machine learning for functions such as object recognition. The communication can be on a real-time basis so that the central computer can receive data from the waste collections vehicle 10 (e.g., through a communication network), gather the data, compile it, quickly make an analysis and then give an output that can be provided to the workers on the waste collection vehicle 10. Alternatively, communication can be bifurcated so that at the end of a designated period, such as a work day of collections, the waste collection vehicle 10 can go to the loading bay, and all of the collected data can be uploaded to the central computer 35 for analysis, and then distributed back to the waste collections vehicle 10 for future usage.

In certain illustrative embodiments, the optical sensor 20 can capture depth-related data associated with the approaching vehicle. For example, when performing object recognition, the optical sensor 20 can identify, e.g., a car, and then if the car moves a certain number of frames per second and gets larger, as measured by the x and y axis of that image, and as that frame enlarges at a certain speed, then the optical sensor 20 would recognize that a trigger event has occurred.

Additionally, if the view of the approaching car is initially blocked or covered by some other object and is not clear in the captured image, and then the waste collection vehicle 10 subsequently moves or changes position (e.g., turns a corner) and the car becomes visible due to the movement of the waste collection vehicle 10, then object recognition and depth perception measuring can be triggered. Machine learning can be incorporated to identify factors like whether the car has velocity, or how to identify what the moving object is.

It is to be understood that the illustrative embodiments disclosed herein are not limited to only approaching vehicles and could be applied in other contexts. It is also to be understood that the illustrative embodiments disclosed herein are not limited to any one particular type of approaching vehicle and may be applicable to all types of vehicles or large moving objects including cars, pick-up trucks, large commercial trucks/trailers, bicycles and other types of vehicles or large moving objects.

Figure 3:
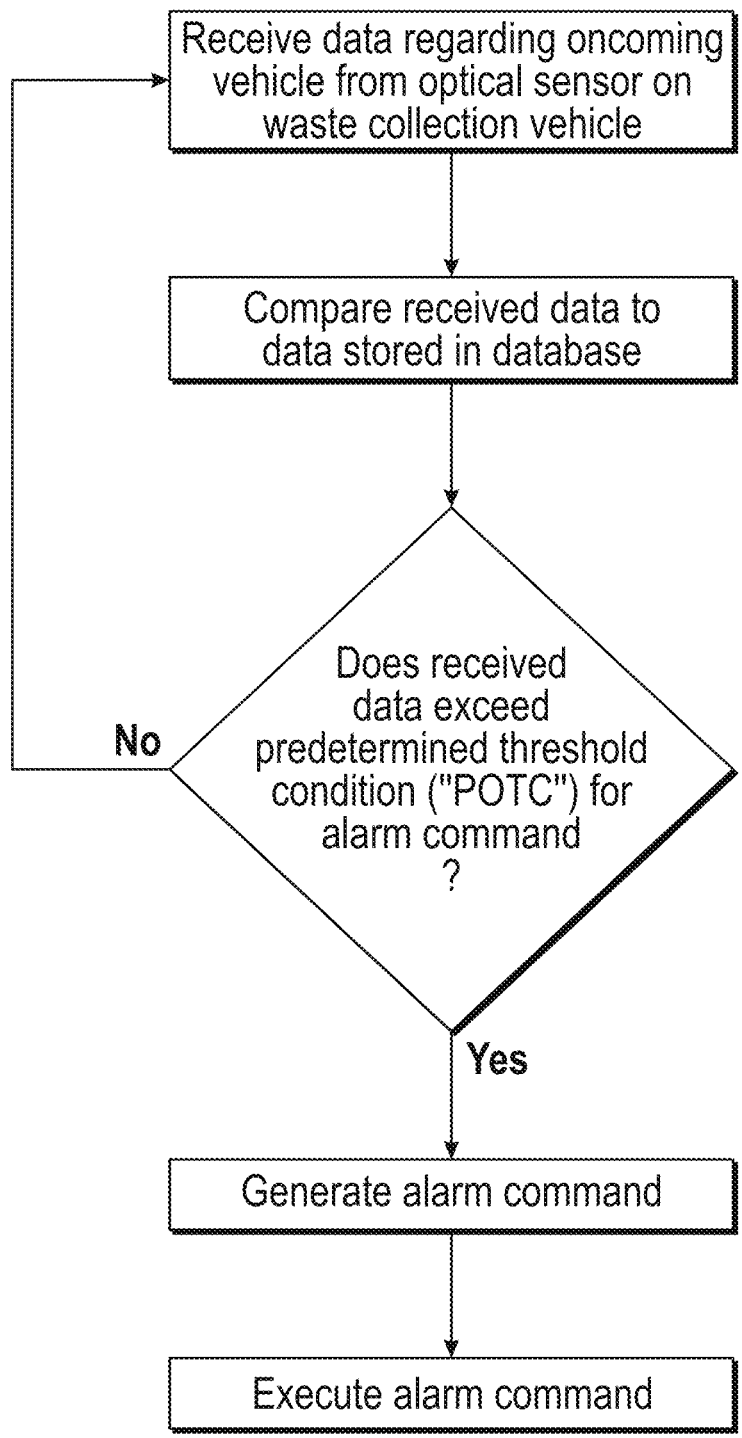
FIG. 3 is a flow chart for identifying oncoming vehicle data and creating an alarm in accordance with an illustrative embodiment of the presently disclosed subject matter.

In certain illustrative embodiments, software can execute the flow of method steps that interact with the various system elements described herein. For example, as illustrated in the flowchart of FIG. 3, the method 70 can be initiated when an image or video or other data relating to an approaching vehicle is received from an optical sensor on a waste service vehicle. The image of the approaching vehicle can be associated with categories of stored information in the database using the associated computer/processor. Once the association is made, a determination can be made of whether certain features of the approaching vehicle in the image, video, or data including but not limited to the identity, proximity, velocity, direction of travel, and size and shape of the approaching vehicle in the image or video, meet or exceed the predetermined threshold condition ("PTC") for initiating an alarm. If the answer is yes, an alarm signal command can be generated.

In certain illustrative embodiments, the system 5 can utilize a computer processor 40 that can automatically review the accumulated images, video, and other collected data relating to the approaching vehicle, which can include without limitation electronic mapping/positioning data and other data such as LiDAR, RADAR and SONAR, and determine whether the predetermined threshold condition is met or exceeded based on machine learning and in association with programmed recognition patterns. In particular, a computer processor 40 may be taught to recognize, for example, patterns in the collected data regarding certain features of the approaching vehicle, such as identity, proximity, velocity, direction of travel, and size and shape, that individually or collectively indicate that the approaching vehicle is likely to collide with the waste collection vehicle 10. Object recognition software 30 may also be used for this purpose. In the flowchart of FIG. 3, for example, if no objects within the video, image or other collected data match the picture and/or description of the sought-after items, control may return to Step 1. However, when one or more objects recognized in the video, image or other collected data captured by the optical sensor substantially match (e.g., within a threshold margin) the picture and/or description in the database, then an alarm signal command can be generated.

In certain illustrative embodiments, the comparing and determining can be performed using machine learning based on a set of programmed data associated with the predetermined overload threshold condition. The set of programmed data can include one or more exemplary data sets that include similar types of information as the collected data associated with the approaching vehicle, e.g., exemplary images, video, electronic mapping/positioning data, and other exemplary data, including but not limited to LiDAR, RADAR and SONAR. For example, if the relied-upon metric is an image, each image in the exemplary data set can display a different exemplary condition, where a first subsection of the plurality of images is pre-identified, based on the exemplary condition, as meeting or exceeding the predetermined threshold condition, and where a second subsection of the plurality of images is pre-identified, based on the exemplary condition, as not meeting or exceeding the predetermined threshold condition.

For image data, the pre-identification of an image in the set of programmed data as meeting or exceeding, or not meeting or exceeding, the predetermined threshold condition can be based upon one or more features such as, but not limited to the identity (e.g., type and/or model of vehicle), proximity, velocity, direction of travel, and size and shape of the approaching vehicle. The processor 40 can be trained, using machine learning or via programming, to recognize and identify the status of the approaching vehicle based on the image data received from the optical sensor. The recognition and identifying of the status of the approaching vehicle can also be based upon one or more features in the image data. The processor 40 can be trained, using machine learning, to match the recognized status of the approaching vehicle with the image of the exemplary images in the set of programmed data that has a corresponding status, and then to categorize the status of the status of the approaching vehicle as either (i) meeting or exceeding, or (ii) not meeting or exceeding, the predetermined threshold condition. A similar type of analysis could also be performed for other collected data besides image data.

In certain illustrative embodiments, an alarm signal command can be generated based on the identifications above. The alarm signal command can include, for example, an alert that is sent to one or more of (i) the workers on the rear of the vehicle 10, (ii) the driver of the vehicle 10, (iii) vehicles in the surrounding area, or (iv) a recipient at a remote location (e.g., the waste company offices).

In certain illustrative embodiments, various training models can be utilized to teach/train the system to detect different types of external items such as, but not limited to, people and vehicles of different shapes and sizes (e.g., SUVs, sedans, trucks, 18 wheelers, bicycles, etc.) as these items approach the waste collection vehicle. For example, a optical sensor 20 such as a camera can be mounted on the back of a waste collection vehicle 10 and various images and/or video can be captured during different time spans or weather environments such as night time, raining, morning, evening and sunny. Also, simulations can be performed of approaching vehicles hitting the back of the waste collection vehicle 10, whereby a camera can be mounted on top of a pole to mimic the vantage point of where the optical sensor 20 would be mounted on the rear end 10a of the waste collection vehicle 20. Images and/or videos can be captured for different vehicle types at different velocities, different vantage points, vehicles stopping at different distances, and/or of vehicles simulating impact on the waste collection vehicle 10. Also, images and/or video can be captured of different types of vehicles in the proximity of the waste collection vehicle 10 to refine object detection and enhance and teach the model to identify all sorts of different vehicles.

The presently disclosed system 5 and method 70 has a number of advantages over existing technologies. The disclosed system 5 and method 70 can advantageously provide a solution to identify fast moving approaching objects that can potentially collide with a waste collection vehicle 10. Through the machine learning process, the disclosed system 5 and method 70 can identify whether the approaching object is, e.g., a bicycle, a person, or a car. The particular application can target a car, but doesn't necessarily need to be just a car. It would preferably be anything relatively fast, for example, faster than 5 mph, but can target slower moving objects as well. The presently disclosed system 5 and method 70 allow the waste service provider to provide a safe working environment for its employees as well as its customers.

Those skilled in the art will appreciate that portions of the subject matter disclosed herein may take the form of an entirely hardware embodiment, an entirely software embodiment, or an embodiment combining software and hardware. Furthermore, portions of the subject matter disclosed herein may be a computer program product on a computer-usable storage medium having computer readable program code on the medium. Any suitable computer readable medium may be utilized including hard disks, CD-ROMs, optical storage devices, or other storage devices. Further, the subject matter described herein may be embodied as systems, methods, devices, or components. Accordingly, embodiments may, for example, take the form of hardware, software or any combination thereof, and/or may exist as part of an overall system architecture within which the software will exist. The present detailed description is, therefore, not intended to be taken in a limiting sense.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

What is claimed is:

1. A system for performing oncoming vehicle detection by a waste collection vehicle, the system comprising:
   an optical sensor disposed on the waste collection vehicle and configured to capture data relating to another vehicle that is approaching the waste collection vehicle, wherein the data comprises a first image where the view of the approaching vehicle is blocked and a second image comprising a view where the image of the vehicle is not blocked;
   a memory storage area, and
   a processor in communication with the memory storage area and configured to, in real time during performance of a waste service activity by the waste collection vehicle:
   receive the data from the optical sensor;
   initiate object recognition and depth perception measuring based upon a determination that the second image comprising a view where the image of the vehicle is not blocked;
   compare the data to a predetermined threshold condition for generating an alarm command based on data stored in the memory storage area;
   determine, based on the comparison, whether the status has met or exceeded the predetermined threshold condition;
   if the status has met or surpassed the predetermined threshold condition, generate an alarm command; and
   execute the alarm command.

2. The system of claim 1, wherein the optical sensor comprises a video camera.

3. The system of claim 1, wherein the optical sensor comprises a SONAR detection device.

4. The system of claim 1, wherein the optical sensor comprises a LIDAR detection device.

5. The system of claim 1, wherein the optical sensor comprises a RADAR detection device.

6. A method for performing oncoming vehicle detection by a waste collection vehicle, the method comprising:
   capturing data relating to an approaching vehicle that is indicative of the status of the approaching vehicle, wherein the data is captured using an optical sensor located on the waste collection vehicle, and wherein the data comprises a first image where the view of the approaching vehicle is blocked and a second image comprising a view where the image of the vehicle is not blocked;
   initiating object recognition and depth perception measuring based upon a determination that the second image comprising a view where the image of the vehicle is not blocked;
   comparing the status from the data to a predetermined threshold condition stored in a memory database;
   determining, based on the comparison, whether the status has met or exceeded the predetermined threshold condition;
   if the status has met or surpassed the predetermined threshold condition, generating an alarm command; and
   executing the alarm command.

\* \* \* \* \*